Feb. 24, 1959 E. F. ESMEIER ET AL 2,874,540
DRIVE UNIT
Filed Dec. 8, 1955
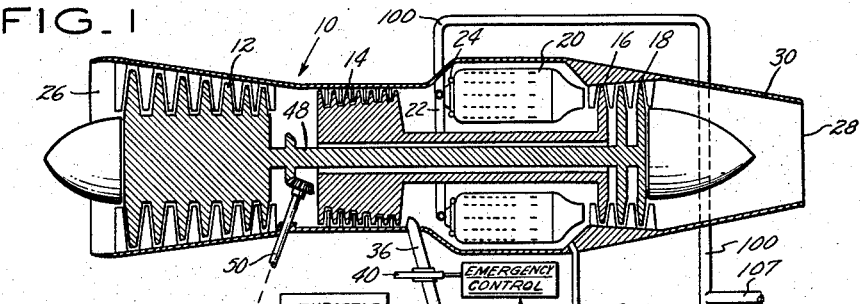
INVENTORS
EDWARD F. ESMEIER
BERTRAND H. BROWN
BY Vernon F. Hauschild
ATTORNEY

United States Patent Office 2,874,540
Patented Feb. 24, 1959

2,874,540

DRIVE UNIT

Edward F. Esmeier, East Windsor, and Bertrand H. Brown, Glastonbury, Conn., assignors to United Aircraft Corporation, East Hartford, Conn., a corporation of Delaware Application December 8, 1955, Serial No. 551,879

4 Claims. (Cl. 60—39.09)

This invention relates to a drive unit and more particularly to a drive unit which is capable of being driven by direct mechanical drive from a power source and which is further capable of being driven as a function of one of the fluid parameters of the power source.

It is an object of this invention to provide a drive unit, such as an accessory drive, which is mechanically driven as a function of the speed of a power plant and which is capable of being driven as a function of one of the pressurized fluid flows being generated by the power plant.

It is a further object of the present invention to provide a drive unit which will be driven as a direct function of power plant speed and which is declutchable as a function of a power plant fluid parameter so that the drive unit, in the declutched position, will drive as a function of this power plant fluid parameter.

It is a further object of the present invention to provide a drive unit of the type described above in which the drive may be automatically switched from the fluid to the direct drive during power plant failure or when the power plant operator so desires.

It is still a further object of the present invention to provide a drive unit of the type described above which is positive in operation and simple in construction.

While we choose to show our invention adapted to drive a fuel pump on a turbojet aircraft power plant, it should be understood that this adaptation has been chosen solely because it is complete and operatable in form and demonstrates one use for our invention. It should be understood that there are several other applications in which this invention could be used.

Referring to the drawings:

Fig. 1 is a cross-sectional view of an aircraft turbojet power plant showing our drive unit as an accessory speed regulator attached to a fuel pump and controlled, in part, by a throttle control and having an emergency control.

Fig. 2 shows a cross-sectional view of the emergency control, one type of variable area throttle control, and our drive unit as an accessory speed regulator.

Fig. 3 is a cross-sectional view of a fixed area throttle control.

Fig. 4 is a view taken along line 4—4 of Fig. 2 to more clearly demonstrate the yoke type connection between the variable area throttle control and the throttle valve to which it is attached and which it controls.

Fig. 5 is a cross-sectional view of a second type of variable area throttle control.

Referring to Fig. 1, we see an aircraft turbojet power plant 10 consisting of a low pressure compressor unit 12, a high pressure compressor unit 14, and turbine units 16 and 18 connected thereto, respectively. Combustion chambers are shown at 20, and fuel manifold 22 together with fuel nozzles 24 supply fuel to the combustion chambers 20 for normal power plant combustion purposes.

Air enters power plant 10 through inlet guide vanes 26 and passes through and is compressed in compressor units 12 and 14 and then passes into combustion chamber 20 to be heated before passing through turbine units 16 and 18 in a power generating function and is thence ejected through discharge 28 of tail pipe 30 to perform a thrust generating function.

Accessory speed regulator 32 is attached to and drives engine fuel pump 34 through accessory output shaft 54. Pump 34 provides fuel to the engine through line 100. Line 101 is the fuel pump bypass line. Conduit means 36 joins accessory speed regulator 32 to the engine, preferably at the discharge section of compressor unit 14. Emergency cutoff control solenoid 38 is connected to a valve unit 40 in conduit means 36 so as to be able to cut off the flow of gas from the compressor discharge section of engine 10 to the accessory speed regulator 32. Solenoid 38 could be operated by the pilot's emergency lever. Throttle control unit 44 is attached to a variable area throttle valve 46 in conduit means 36 so as to govern the flow of compressor air which enters accessory speed regulator 32 from engine or power plant 10. Accessory speed regulator 32 is connected to compressor-turbine shaft 48 of engine 10 through to takeoff shaft 50. It should be understood that takeoff shaft 50 may connect accessory speed regulator 32 to engine or power plant 10 in a direct drive relationship through input shaft 52 or a reduction gear unit could be used in connection with shaft 50 so that the accessory speed regulator operates as a function of engine or power plant speed. Referring to Fig. 2, we see that accessory speed regulator 32 consists of input shaft 52 and output shaft 54 which are carried by bearings 138 and 140. Clutch unit 56 serves to connect input shaft 52 to output shaft 54 when the clutch is in an engaged position. At low power operating conditions of engine 10, spring 58 causes male clutch unit 60 to engage female clutch unit 62 to cause output shaft 54 to be driven directly by input shaft 52. It will be noted that output shaft 54 carries turbine unit 64. Male clutch unit 60 engages output shaft 54 through keyway 136. It will be seen that compressor discharge air passes through conduit means 36 and into chamber 66 from whence it passes through turbine inlet or stators 142, turbine 64 and out turbine exhaust duct 146 and also passes through chamber 68, line 70 and chamber 72 thence into expandable pressure unit 74, through shaft 144. For optimum operation, the collar portion of flange 144 should not abut against female clutch unit 62 so that no friction occurs between these parts when the unit is declutched. When the pressure of the compressor discharge gas exceeds a predetermined value, pressure expansion unit 74, which may be a tubelike unit, expands to overcome the force of spring 58 and disengage male unit 60 from female unit 62 of clutch 56, thereby disconnecting input shaft 52 from output shaft 54 and permitting output shaft 54 to be driven by turbine 64 which is in turn driven by the pneumatic flow through conduit means 36, which, as here shown, is a function of compressor discharge pressure.

Applicants have chosen to show their drive unit invention in connection with an aircraft turbojet power plant because it is a characteristic of such power plant that the fuel consumption or requirement decreases greatly at altitude. For this reason, if a fuel pump is used which is directly driven as a function of engine speed, it must be of such capacity that the maximum fuel requirements of the engine for sea level operation are satisfied. A pump of this capacity will pump many times the altitude fuel requirement of such an engine and the largest portion of the fuel is continually being bypassed at altitude thereby generating undesirable heat in the fuel. It will be seen that a fuel pump drive unit which will provide greatly diminished fuel flow at altitudes is required for aircraft engine operation. Applicants' drive unit accomplishes this function.

While applicants show throttle control units 44 and 99 and a throttle valve 46 in conduit means 36, in many aircraft engine installations such equipment might not be needed, since compressor discharge pressure diminishes with altitude and because output shaft 54 is driven as a function of compressor discharge pressure once clutch unit 56 is decoupled. The speed of fuel pump 34, driven by output shaft 54, will reduce with altitude and supply less fuel to the engine.

If greater control of output shaft in the decoupled position is required, or desired, a fixed area orifice 76 (see Fig. 3) may be placed in conduit 36 for engine-to-control matching purposes. If still greater control is required, a valve comparable to a butterfly valve 46, Fig. 2, may be inserted in conduit 36. Butterfly valve 46 is caused to rotate by a throttle control such as 44 or 99.

While it should be understood that any control which will sense engine fuel requirements and position throttle valve 46 so as to increase or decrease fuel flow to the engine as required may be used, applicants show two preferred embodiments of such a control, one in Figs. 2 and 4 and the other in Fig. 5.

In Figs. 2 and 4, it may be seen that throttle control 44 consists of double acting valve 78 which is biased in one direction by spring 80 and which carries knob 82. Knob 82, in combination with yoke unit 84 which is attached to valve shaft 86 which carries valve 46, translates the translatory motion of valve 78 into the rotary motion of shaft 86 and throttle valve 46. Spring adjustment unit 88 may be used to adjust the load on spring 80. The portion of throttle control 44 on the spring side of piston 78 is vented to atmosphere through aperture 90.

Burner discharge pressure is an accepted parameter for sensing power plant fuel requirements and, therefore, this pressure is introduced to the anti-spring side of piston 78 through line 92. In this fashion, the position of piston 78 and, therefore, valve 46 is governed as a function of burner discharge pressure. As burner discharge pressure rises, this indicates the need for additional fuel in the power plant. An increase in burner discharge pressure will cause piston 78 to move against the pressure of spring 80 and increase the opening of valve 46.

Referring to Fig. 5, we see a second modification of the variable area throttle valve control and this modification is designated by numeral 99. The three main components are fuel metering valve 102, pilot piston or valve 118, and servo piston 128.

Fuel metering valve 102 is located in fuel line 100 and the pressure drop across this valve is an indication of the output of fuel pump 34. When the pressure drop across valve 102 drops below a predetermined value, it is an indication that the fuel pump is not delivering sufficient fuel to the engine and that the speed of the fuel pump must be increased.

It will be seen in Fig. 5 that fuel pressure on the downstream side of fuel metering valve 102 passes through line 112 into chamber 114 and exerts a force in combination with the force of spring 116 against the right side of pilot valve 118. The fuel pressure in chamber 114 is designated as $P_4$. Fuel from the upstream side of metering valve 102 passes through line 108 and into chamber 110 to act against the left side piston 118. The fuel pressure on the left side of piston 118 is designated as $P_3$.

Pilot valve 118 consists of three lands separating two grooves and in the position shown in Fig. 5, the three lands block off passages 106 and 104 which hold fuel at fuel pump inlet pressure, $P_1$, and also block off passage 107 which holds fuel at fuel pump discharge pressure, $P_2$. The grooves in valve 118 are in communication with chambers 122 and 126 on the left and right sides of servo piston 128 respectively. Servo piston 128 is connected to and actuates rod 130 which in turn causes shaft 134 to rotate through crank unit 132. Rod 134 carries throttle valve 46' so that throttle 46' rotates with shaft 134.

As stated above, when the pressure drop across fuel metering valve 102 becomes too low, more fuel is needed by the engine and, therefore, we must increase the speed of fuel pump 34. We will now illustrate how this increase in pump speed is brought about. As the fuel flow becomes too low, the combined force of spring 116 and pressure $P_4$ exerted against the right side of valve 118 overcomes pressure $P_3$ which is acting against the left side of valve 118 so that pilot valve 118 moves to the left, thereby permitting fuel pump inlet pressure, $P_1$, from line 104 to pass through line 120 and into chamber 122 to act on the left side of servo piston 128. At the same time, fuel pump discharge pressure, $P_2$, from the line 107 passes through line 124 and into chamber 126 to act on the right side of piston 128. Since pressure $P_2$ is greater than $P_1$, piston 128 is moved to the left, thereby moving shaft 130 to the left and rotating shaft 134 through crank unit 132 so as to open throttle valve 46' and thereby increase the flow of compressor discharge air through conduit means 36 and turbine unit 64. As turbine unit 64 increases in speed, it increases the speed of shaft 54 and fuel pump 34 to increase the flow of fuel to the engine.

Should the fuel flow to the engine exceed a predetermined flow, the pressure drop across fuel metering valve 102 will increase to a point where pressure $P_3$ will sufficiently exceed the combined force of pressure $P_4$ and spring 116 so that valve 118 will move to the right causing servo valve 128 to move to the right to close throttle valve 46' and thereby decrease the flow of compressor discharge gas through turbine unit 64. Turbine unit 64 will thereby be decreased in speed and thereby decrease the speed of fuel pump 34.

It should be understood that emergency cutoff valve 40 or throttle valve 46 may be mechanically linked to the pilot's control lever so that either may be manually operated by the pilot.

We claim:

1. In combination with an aircraft turbojet engine having an accessory speed regulator comprising a power input shaft, a power output shaft having a turbine mounted thereon, and a clutch unit connecting said input shaft to said output shaft, means to connect said input shaft to said engine so that said output shaft may be driven as a function of engine speed when said clutch is engaged, conduit means joining a pressurized section of said engine to said speed regulator, means responsive to pressure from said pressurized engine section to decouple said clutch, and means responsive to pressure from said pressurized engine section to drive said output shaft with said clutch decoupled.

2. In combination with an aircraft turbojet engine having a compressor, an accessory speed regulator comprising a power input shaft, a power output shaft having a turbine mounted thereon, and a clutch unit connecting said input shaft to said output shaft, means to connect said input shaft to said engine so that said output shaft may be driven as a function of engine speed when said clutch is engaged, conduit means joining the compressor discharge section of said engine to said speed regulator, means to decouple said clutch as a function of compressor discharge pressure, means to drive said output shaft as a function of compressor discharge pressure with said clutch decoupled, and flow governing means associated with said conduit means.

3. In combination with an aircraft turbojet engine having a compressor, an accessory speed regulator comprising a power input shaft, a power output shaft having a turbine mounted thereon, and a clutch unit connecting said input shaft to said output shaft, means to connect said input shaft to said engine so that said output shaft may be driven as a function of engine speed when said clutch is engaged, conduit means joining the compressor discharge section of said engine to said speed regulator, means to decouple said clutch as a function of compressor discharge pressure, means to drive said output shaft as a function of compressor discharge pressure when said clutch is decoupled, flow governing means associated with said conduit means, and emergency flow cutoff means associated with said conduit means.

4. In combination with an aircraft turbojet engine having a compressor, an accessory speed regulator comprising a power input shaft, a power output shaft having a turbine mounted thereon, and a clutch unit connecting said input shaft to said output shaft, a fuel pump connected to said output shaft, means to connect said input shaft to said engine so that said fuel pump may be driven as a function of engine speed when said clutch is engaged, conduit means joining the compressor discharge section of said engine to said speed regulator, means to decouple said clutch as a function of compressor discharge pressure and means to drive said fuel pump as a function of compressor discharge pressure when said clutch is decoupled, flow governing means associated with said conduit means and emergency flow cutoff means associated with said conduit means.

References Cited in the file of this patent
UNITED STATES PATENTS

| | | |
|---|---|---|
| 2,531,761 | Zucrow | Nov. 28, 1950 |
| 2,656,675 | Coar | Oct. 27, 1953 |
| 2,665,674 | Metsger et al. | Jan. 12, 1954 |
| 2,806,351 | Kent et al. | Sept. 17, 1957 |

FOREIGN PATENTS

| | | |
|---|---|---|
| 159,535 | Australia | Oct. 29, 1954 |
| 1,093,874 | France | Nov. 24, 1954 |
| 495,544 | Great Britain | Nov. 15, 1938 |
| 735,874 | Great Britain | Aug. 31, 1955 |